US012407095B2

(12) United States Patent
Tong et al.

(10) Patent No.: US 12,407,095 B2
(45) Date of Patent: Sep. 2, 2025

(54) ANTENNA ASSEMBLY AND COMMUNICATION DEVICE

(71) Applicant: Huawei Technologies Co., Ltd., Shenzhen (CN)

(72) Inventors: Youwan Tong, Xi'an (CN); Ren Fang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 147 days.

(21) Appl. No.: 18/252,820

(22) PCT Filed: Nov. 9, 2021

(86) PCT No.: PCT/CN2021/129497
§ 371 (c)(1),
(2) Date: May 12, 2023

(87) PCT Pub. No.: WO2022/100566
PCT Pub. Date: May 19, 2022

(65) Prior Publication Data

US 2023/0420839 A1 Dec. 28, 2023

(30) Foreign Application Priority Data

Nov. 13, 2020 (CN) ........................ 202011267799.2

(51) Int. Cl.
*H01Q 3/14* (2006.01)
*H01Q 3/36* (2006.01)
*H01Q 15/02* (2006.01)

(52) U.S. Cl.
CPC ................ *H01Q 3/14* (2013.01); *H01Q 3/36* (2013.01); *H01Q 15/02* (2013.01)

(58) Field of Classification Search
CPC ........ H01Q 1/002; H01Q 1/241; H01Q 1/246; H01Q 3/14; H01Q 3/26; H01Q 3/32;
(Continued)

(56) References Cited

U.S. PATENT DOCUMENTS

2017/0214145 A1* 7/2017 Elad .................... H01Q 19/175
2018/0183152 A1* 6/2018 Turpin ................ H01Q 25/008
(Continued)

FOREIGN PATENT DOCUMENTS

CN 205609758 U 9/2016
CN 109346843 A 2/2019
(Continued)

*Primary Examiner* — Hoang V Nguyen
(74) *Attorney, Agent, or Firm* — Conley Rose, P.C.

(57) ABSTRACT

An antenna assembly includes a lens, a guide rail, an antenna array, and a phase shifter. The lens has a first refractive surface. The guide rail is a linear guide rail and is located on one side of the first refractive surface of the lens. The antenna array includes a plurality of radiating elements. The antenna array is slidingly connected to the guide rail. As the antenna array moves on the guide rail, a beam pointing direction of the antenna assembly moves in an extension direction of the guide rail, to perform mechanical beam sweeping within a first sweeping range in the extension direction of the guide rail. The phase shifter is connected to the plurality of radiating elements and is configured to adjust feed phases of the plurality of radiating elements, to perform phase modulation sweeping within a second sweeping range.

20 Claims, 8 Drawing Sheets

(58) Field of Classification Search
CPC ............ H01Q 3/34; H01Q 3/36; H01Q 15/02; H01Q 15/08; H01Q 19/06; H01Q 19/062; H01Q 21/061; H01Q 21/062; H01Q 21/24; H01Q 25/008; H01Q 3/04; H01Q 5/42; H01Q 3/46; H01Q 3/2658; H01Q 25/04; H01Q 3/247; H01Q 3/30; H01Q 9/0421; H01Q 9/16; H01Q 19/08; H01Q 19/065; H01Q 1/1264; H01Q 19/175; H01Q 3/18; H01Q 3/12; H01Q 3/2664; H01Q 3/16; H01Q 19/12; H01Q 1/36; H01Q 21/065
See application file for complete search history.

(56) References Cited

U.S. PATENT DOCUMENTS

| | | | |
|---|---|---|---|
| 2020/0091622 A1 | 3/2020 | Turpin et al. | |
| 2023/0231324 A1* | 7/2023 | Turpin ................ | H01Q 25/008 342/354 |

FOREIGN PATENT DOCUMENTS

| | | |
|---|---|---|
| CN | 109742555 A | 5/2019 |
| CN | 110165403 A | 8/2019 |

* cited by examiner

ANTENNA ASSEMBLY AND COMMUNICATION DEVICE

CROSS-REFERENCE TO RELATED APPLICATIONS

This is a National Stage of International Patent Application No. PCT/CN2021/129497 filed on Nov. 9, 2021, which claims priority to Chinese Patent Application No. 202011267799.2 filed on Nov. 13, 2020. The disclosures of the aforementioned applications are hereby incorporated by reference in their entireties.

TECHNICAL FIELD

This application relates to the field of terminal device technologies, and in particular, to an antenna assembly and a communication device.

BACKGROUND

As a wireless broadband access device, customer premise equipment (customer premise equipment, CPE for short) may convert a signal sent by a base station into a Wi-Fi signal universal to mobile terminals such as a smartphone, a tablet computer, and a notebook computer, and may support a plurality of mobile terminals in accessing the internet at the same time. To enable a user to receive a high-quality signal, some existing CPEs are designed to extend performance of antennas of the CPEs, so that the antennas can support beam sweeping at a specific angle while a receive beam width is limited. Conventional antenna sweeping is generally performed through mechanical rotation sweeping, phased array sweeping, or the like. However, these sweeping manners have some disadvantages. For example, the mechanical rotation sweeping increases a profile height of an antenna, and consequently, the antenna occupies large space in CPE, which is not conducive to miniaturization of the CPE. The phased array sweeping causes a small beam sweeping range of CPE due to constraints such as a quantity of radiating elements and a quantity of phase shifters.

SUMMARY

This application provides an antenna assembly and a communication device, to enable the antenna assembly to support beam sweeping within a large range.

According to a first aspect, this application provides an antenna assembly, where the antenna assembly includes a lens, a guide rail, an antenna array, and a phase shifter. The lens includes a first refractive surface and a second refractive surface. The lens may be configured to converge a signal beam from one side of the first refractive surface into a narrow beam to be emergent from the second refractive surface, or may converge a signal beam from one side of the second refractive surface into a narrow beam to be emergent from the first refractive surface. The guide rail is a linear guide rail, and the guide rail may be disposed on one side of the first refractive surface of the lens. The antenna array includes a plurality of radiating elements arranged in an array. The antenna array is slidingly connected to the guide rail. As the antenna array moves on the guide rail, a beam pointing direction of the antenna assembly moves in an extension direction of the guide rail, so that mechanical beam sweeping can be performed within a first sweeping range in the extension direction of the guide rail, to implement beam sweeping in the extension direction of the guide rail. The phase shifter is connected to the plurality of radiating elements and is configured to adjust feed phases of the plurality of radiating elements, so that when the antenna array is at different locations on the guide rail, phase modulation sweeping can be performed within a second sweeping range by adjusting the feed phases of the plurality of radiating elements, where the second sweeping range is a phase modulation sweeping angle at each sweeping location within the first sweeping range of the antenna array.

In the foregoing solution, the antenna array is slidingly connected to the guide rail, so that mechanical sweeping can be implemented by changing a location of the antenna array, and when the antenna array is at different locations, the phase shifter can be controlled to adjust the feed phases of the radiating elements, to implement phase modulation sweeping. Therefore, a sweeping range of the antenna assembly can be expanded generally, and the antenna assembly can obtain a higher gain. In addition, because the guide rail is of a linear structure, in this solution, a profile height of the antenna assembly can be further lowered while a gain of the antenna assembly can be increased, so that space occupied by the antenna assembly in the communication device can be reduced. This facilitates reduction of an overall volume of the communication device.

In specific configuration, in the extension direction of the guide rail, both ends of the guide rail extend beyond corresponding ends of the lens. It is assumed that a length of one end of the guide rail extending beyond a corresponding end of the lens is l', and l' satisfies: $l' \geq f*\tan\theta$, where f is a distance between the guide rail and the lens in a direction perpendicular to the extension direction of the guide rail, and θ is a maximum phase modulation sweeping angle that can be implemented during phase modulation sweeping by adjusting the feed phase of each radiating element through the phase shifter. In this solution, the sweeping range of the antenna array when the antenna array moves on the guide rail can be increased, and a risk that the antenna array slides off the guide rail can be further reduced.

In some possible implementations, the lens may be specifically a convex lens. In this case, one convex surface of the convex lens may be formed as a first refractive surface, and the other convex surface of the convex lens may be formed as a second refractive surface. In the extension direction of the guide rail, an effective dielectric constant of the lens decreases from the middle to two sides, so that a signal beam converges when a signal is received or sent.

In some possible implementations, the lens may be specifically a cylindrical lens. The lens includes a cylindrical surface and a flat surface that are connected in a circumferential direction. In an implementation, the cylindrical surface of the lens may be formed as a first refractive surface, and the flat surface of the lens may be formed as a second refractive surface. In another implementation, the flat surface of the lens may be formed as a first refractive surface, and the cylindrical surface of the lens may be formed as a second refractive surface.

When the lens is the cylindrical lens, the extension direction of the guide rail is perpendicular to a length direction of the lens. In this case, in a direction of the guide rail, an effective dielectric constant of the lens decreases from the middle to two sides, so that a signal beam converges when a signal is received or sent.

In some possible implementations, the guide rail may be located in a focal plane of the lens, so that when moving on the guide rail, the antenna array can receive a beam converged by the lens.

In some possible implementations, the guide rail intersects the principal axis of the lens, and an included angle between the guide rail and the principal axis of the lens may range from 80° to 100°. Specifically, when the guide rail is located in the focal plane, the guide rail and the principal axis of the lens are vertically intersected, thereby improving signal transmission quality.

In some possible implementations, the first sweeping range is parallel to the second sweeping range. In this case, the first sweeping range and the second sweeping range may be approximately located in a same plane. In other words, mechanical sweeping and phase modulation sweeping are performed in a same dimension. A sweeping range of the antenna assembly in the plane can be generally increased by combining the mechanical sweeping and the phase modulation sweeping.

In some possible implementations, the first sweeping range and the second sweeping range may intersect each other. In other words, mechanical sweeping and phase modulation sweeping may be performed in two intersecting dimensions, to increase the sweeping range of the antenna assembly.

To facilitate sliding connection between the antenna array and the guide rail, the antenna assembly may further include a sliding part. The antenna array is fixedly disposed on the sliding part, and the sliding part is slidingly assembled on the guide rail. In this way, when sliding on the guide rail, the sliding part can drive the antenna array 21 to slide synchronously.

In some possible implementations, the guide rail intersects the principal axis of the lens, and the antenna assembly may further include a driving mechanism. The driving mechanism is connected to the antenna array or the sliding part, and may be configured to drive the antenna array to slide on the guide rail, thereby improving operating reliability of the antenna assembly.

In specific configuration, the driving mechanism may include a motor and a screw. The screw includes a screw rod and a nut assembled on the screw rod. The screw rod is connected to an output shaft of the motor, and the nut is connected to the antenna array or the sliding part. In this way, a rotation motion that is output by the motor can be converted into a linear motion that can drive the sliding part to move, and then the sliding part drives the antenna array to move synchronously.

According to a second aspect, this application further provides a communication device. The communication device includes a housing, a control unit disposed in the housing, and the antenna assembly in any one of the foregoing possible implementations. A lens of the antenna assembly is disposed on the housing, and a second refractive surface of the lens faces an outer side of the housing. The control unit is separately connected to a driving mechanism and a phase shifter, to control the driving mechanism to drive an antenna array to move on a guide rail, to perform beam sweeping in an extension direction of the guide rail. The control unit may further send a phase configuration signal to the phase shifter when the antenna array moves to each location, to control the phase shifter to adjust a feed phase of each radiating element, to adjust a beam pointing direction of the antenna assembly. The communication device may implement a large beam sweeping range, and because a profile height of the antenna assembly is small, a miniaturization design of the communication device is also facilitated.

In some possible implementations, the lens and the housing may be of an integrated structure, to simplify an assembly process of the communication device and lower assembly difficulty.

REFERENCE NUMERALS

Figure 1:
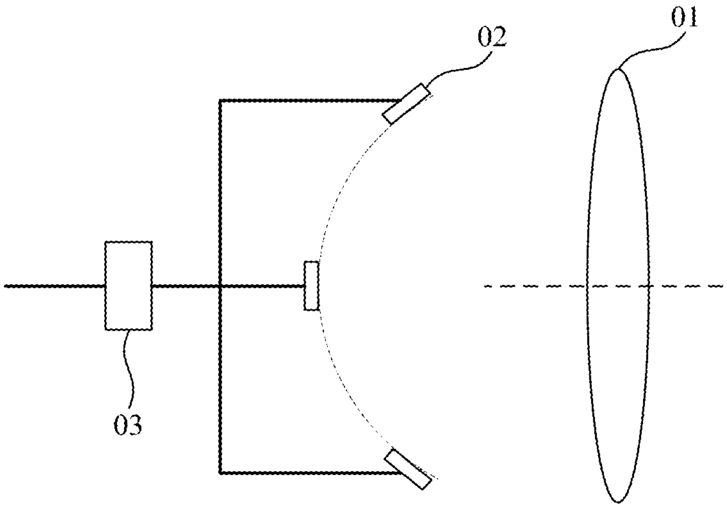
FIG. 1 (PRIOR ART)
FIG. 1 is a schematic diagram of a structure of an antenna assembly of existing CPE.

In the conventional technology:

01—lens; 02—antenna array; 03—multiplexer switch.

In embodiments of this application:

100—base station; 200—CPE; 10—housing; 20—antenna assembly; 21—antenna array; 22—guide rail; 23—lens;

24—phase shifter; 11—opening; 231—first refractive surface; 232—second refractive surface; 25—sliding part; 211—radiating element;

261—screw; 262—nut; 27—control unit; 210—outdoor unit; 220—indoor unit.

DESCRIPTION OF EMBODIMENTS

To make the objectives, technical solutions, and advantages of this application clearer, the following further describes this application in detail with reference to the accompanying drawings.

It should be noted that, in this specification, reference numerals and letters in the following accompanying drawings represent similar items. Therefore, once an item is defined in an accompanying drawing, the item does not need to be further defined or interpreted in the following accompanying drawings.

In descriptions of this application, it should be noted that orientation or location relationships indicated by terms “center”, “above”, “below”, “left”, “right”, “vertical”, “horizontal”, “inner”, “outer”, and the like are orientation or location relationships based on the accompanying drawings, and are merely intended for conveniently describing this application and simplifying descriptions, rather than indicating or implying that an apparatus or an element in question needs to have a specific orientation or needs to be constructed and operated in a specific orientation, and therefore cannot be construed as a limitation on this application. In addition, terms “first” and “second” are merely used for a purpose of description, and shall not be understood as an indication or implication of relative importance.

In descriptions of this application, it should be noted that unless otherwise expressly specified and limited, terms “mount”, “interconnect”, and “connect” should be understood in a broad sense. For example, the terms may indicate a fixed connection, a detachable connection, or an integral connection; may be a mechanical connection or an electrical connection; or may be direct interconnection, indirect interconnection through an intermediate medium, or communication between the interior of two elements. An ordinary technician in the art may understand specific meanings of the foregoing terms in this application based on a specific situation.

For ease of understanding an antenna provided in embodiments of this application, the following first describes an application scenario of the antenna. The antenna provided in embodiments of this application may be applied to a communication device such as a base station or CPE, and is configured to enable the communication device to implement signal sending and receiving functions. Using the CPE as an example, the CPE is a wireless broadband access device, and may convert a signal sent by a base station into a Wi-Fi signal universal to mobile terminals such as a smartphone, a tablet computer, and a notebook computer, and may support a plurality of mobile terminals in accessing the internet at the same time. The CPE may be mounted indoors or outdoors. During actual deployment, for convenience of mounting, the CPE is generally directly placed at a specific location and then fixed. Because the CPE needs to receive a radio signal from the base station, and the base station needs to cover a plurality of users in an area during deployment, for a specific CPE user, a direction of arrival of the radio signal is undetermined. To enable a user to receive a high-quality signal, a conventional manner is to adjust a placement angle of the CPE to match the direction of arrival. However, during mounting the CPE, especially after the CPE is fixed, adjusting the placement angle of the CPE involves a large amount of work, and causes an increase in mounting costs.

To resolve this problem, some existing CPEs are designed to extend performance of antennas of the CPEs, to enable the antennas to support large-angle beam sweeping while a receive beam width is limited. Therefore, a beam direction can be adjusted when a placement location and a placement angle of the CPE are fixed, so that a CPE user can receive a high-quality signal.

Refer to FIG. 1. FIG. 1 is a schematic diagram of a structure of an antenna assembly of existing CPE. The antenna assembly includes a lens 01, a plurality of antenna arrays 02, and a multiplexer switch 03. The antenna arrays 02 are distributed in an arc shape near a focal plane of the lens 01. One end of the multiplexer switch 03 is connected to a radio frequency path of the CPE, and the other end of the multiplexer switch is separately connected to the plurality of antenna arrays 02. Switching performed between the antenna arrays 02 causes the radio frequency path to be connected to different antenna arrays 02. It should be noted that a dashed line in FIG. 1 represents an arrangement manner of the plurality of antenna arrays, but does not represent an actual structure of the CPE. Because locations of the antenna arrays 02 are different, when the radio frequency path is switched to be connected to the antenna arrays 02, beam directions of different antenna arrays 02 are different. In this way, an objective of beam sweeping can be achieved after beams that are output by different antenna arrays 02 pass through the lens 01. However, this solution still has obvious disadvantages. First, because the plurality of antenna arrays 02 need to be disposed, manufacturing costs of the CPE are increased; second, the distribution of the plurality of antenna arrays 02 in an arc shape increases a profile height of the antenna assembly. As a result, the antenna assembly occupies large space in the CPE. This is not conducive to miniaturization of the CPE.

Another common antenna that can implement beam sweeping is a phased array antenna. For the phased array antenna, phase differences between radiating elements are adjusted by using phase shifters, to change a pointing direction of a maximum value in an antenna directivity pattern, thereby achieving the objective of beam sweeping. However, due to factors such as a layout of the radiating elements, phase adjustment precision, and a restriction on quantities of the radiating elements and the phase shifters due to costs, a beam adjustment range of the antenna is small, and a gain of the antenna is low.

Based on this, embodiments of this application provide an antenna assembly and a communication device to which the antenna assembly is applied. The antenna assembly has a small size, and can support beam sweeping in a large range, so that communication performance of the communication device can be improved. The following specifically describes, with reference to the accompanying drawings, the antenna assembly and the communication device provided in embodiments of this application.

Figure 2:
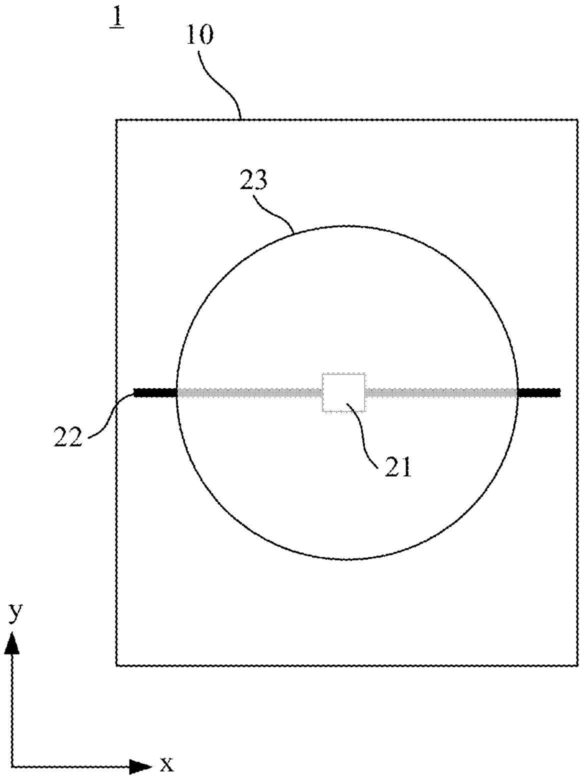
FIG. 2 is a front view of a communication device according to an embodiment of this application.
Figure 3:
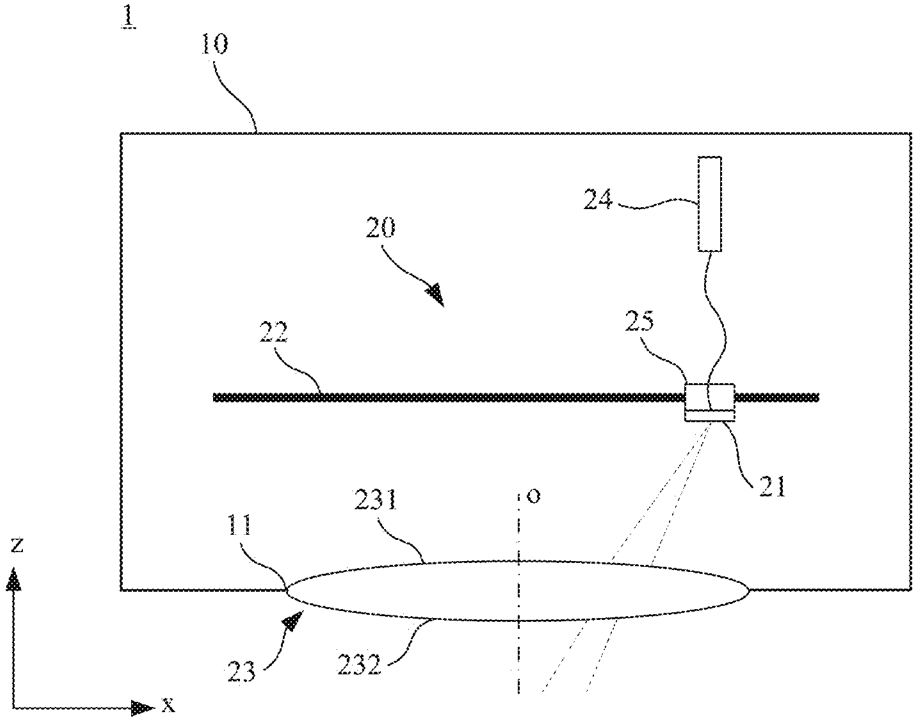
FIG. 3 is a top view of the communication device in FIG. 2.

FIG. 2 is a front view of a communication device according to an embodiment of this application. FIG. 3 is a top view of the communication device in FIG. 2. The communication device includes a housing 10, a circuit board (not shown in the figure) disposed in the housing 10, and an antenna assembly 20. The antenna assembly 20 may include an antenna array 21, a guide rail 22, a lens 23, and a phase shifter 24. It should be noted that FIG. 3, FIG. 4, and the following related accompanying drawings show only some components included in the communication device as an example. Actual shapes, actual sizes, actual locations, and actual structures of these components are not limited by FIG. 3, FIG. 4, and the following accompanying drawings.

For ease of description, a width direction of the communication device 1 is defined as an x-axis, a length direction of the communication device 1 is defined as a y-axis, and a thickness direction of the communication device is defined as a z-axis. It may be understood that a coordinate system of the communication device 1 may be flexibly set according to a specific actual requirement. In actual application, after the communication device 1 is mounted and fixed, the width direction of the communication device 1 may be set in a horizontal direction, and the length direction of the communication device 1 may be set in a vertical direction. In other words, in this embodiment of this application, an x-axis direction is the horizontal direction, and a y-axis direction is the vertical direction.

The housing 10 is of a cavity structure, and may be configured to support and protect each element inside the communication device 1. For example, the housing 10 may reduce impact on an internal element of the communication device 1, prevent performance of the communication device 1 from being affected by displacement of the internal element, and ensure normal use of the communication device 1. For another example, the housing 10 may further reduce direct contact between an external foreign matter, such as dust or water vapor, and the internal element, thereby reducing a risk of damage to the internal element.

In addition, an opening 11 is provided on the housing 10, so that a signal beam emitted by a base station can be propagated to the lens 23 through the opening 11, and a signal beam refracted by the lens 23 can be propagated to the base station through the opening 11.

Figure 4:
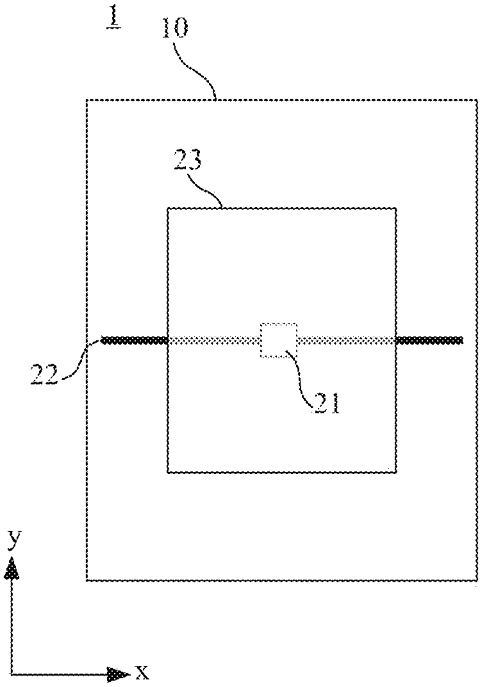
FIG. 4 is a front view of a communication device according to another embodiment of this application.

Still refer to FIG. 3 and FIG. 4. The lens 23 is disposed at the opening. The lens 23 includes a first refractive surface 231 and a second refractive surface 232. The first refractive surface 231 faces an inner side of the opening 11, and the second refractive surface 232 faces an outer side of the opening 11. A material of the lens 23 may be a dielectric material that allows an electromagnetic wave to pass through. The lens may be configured to converge a signal beam (as shown by dashed lines in FIG. 3 and FIG. 4) from one side of the first refractive surface 231 into a narrow beam to be emergent from the second refractive surface 232, or converge a signal beam from one side of the second refractive surface 232 into a narrow beam to be emergent from the first refractive surface 231, to improve a gain of the antenna assembly.

In this embodiment, unless otherwise specified, dashed lines in FIG. 3, FIG. 4, and the following accompanying drawings all represent signal beams. It should be understood that the accompanying drawings merely show signal beams as an example, and an actual waveform, an actual propagation direction, and an actual propagation distance of the signal beam are not limited by FIG. 3, FIG. 4, and the following accompanying drawings.

In some implementations, the lens 23 may be embedded in the opening 11. In this way, a profile height (in other words, a size in a z-axis direction) of the communication device 1 can be reduced, so that a structure of the communication device 1 is more compact. In addition, difficulty in mounting and fixing the lens 23 can be further lowered. During specific implementation, the lens 23 may be fixed in the opening 11 by bonding. Alternatively, the lens may be fixed in the housing 10 by using a mechanical part such as a support. In this case, a cover may be disposed at the opening 11 to seal the housing 10, to prevent an external foreign matter from entering the housing 10 to cause an adverse impact on a function of the communication device 1.

In some other implementations, the lens and the housing may alternatively be designed in an integrated manner. In other words, the lens and the housing may be of an integrated structure. In this case, no opening needs to be provided on the housing, and a step of assembling the lens and the housing may be canceled. Therefore, an assembly process of the communication device can be simplified, and assembly difficulty can be lowered.

A type of the lens 23 is not limited. For example, in the embodiment shown in FIG. 3, the lens 23 may be specifically a convex lens. In this case, the first refractive surface 231 is one convex surface of the lens 23, and the second refractive surface 232 is the other convex surface of the lens 23. When the lens 23 is fixed in the opening 11, a principal axis of the lens 23 may be specifically set in the z-axis direction. It should be noted that, in this embodiment of this application, the principal axis of the lens 23 may be understood as an axis on which a propagation direction of a signal beam or light does not change after the signal beam or light passes through the lens 23. For the convex lens, the principal axis is a straight line that passes through sphere centers of the two convex surfaces of the convex lens.

Figure 5:
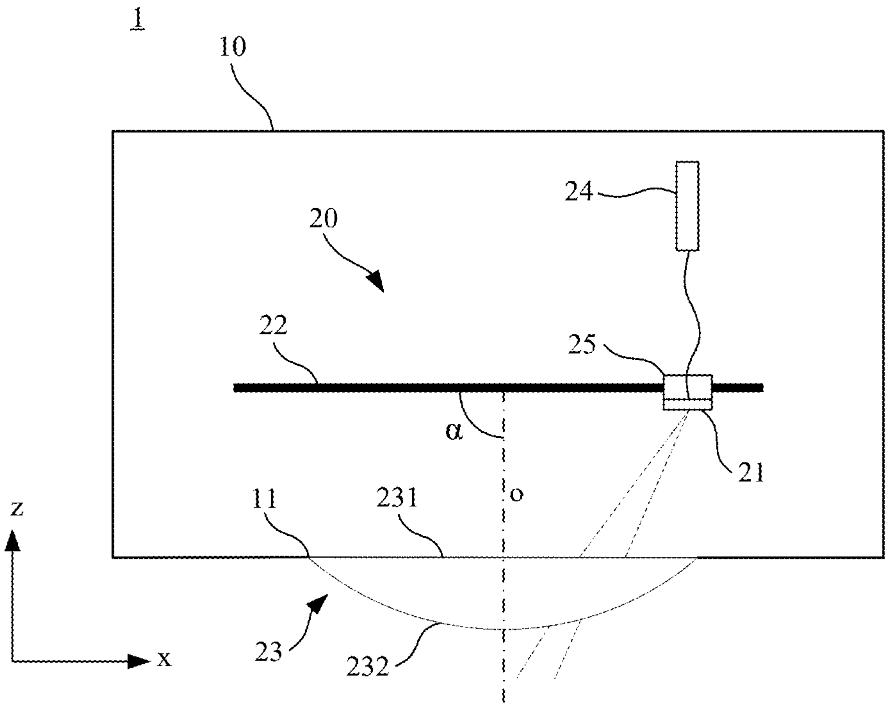
FIG. 5 is a top view of the communication device in FIG. 4.

FIG. 4 is a front view of a communication device according to another embodiment of this application. FIG. 5 is a top view of the communication device in FIG. 4. Refer to FIG. 4 and FIG. 5 together. In this embodiment, a lens 23 may be specifically a cylindrical lens, and a length direction of the lens 23 is set in a y-axis direction. In addition, in a circumferential direction of the lens 23, a cylindrical surface of the lens 23 may face an outer side of an opening 11, and a flat surface of the lens 23 may face an inner side of the opening 11. In this case, a first refractive surface 231 is the flat surface of the lens 23, and a second refractive surface 232 is the cylindrical surface of the lens 23.

When the lens 23 is fixed in the opening 11, an effective dielectric constant of the lens 23 decreases from the middle to two sides in a horizontal dimension (an x-axis direction). During specific implementation, a width direction of the lens 23 is set in the x-axis direction, a length direction of the lens 23 is set in the y-axis direction, and a principal axis of the lens 23 is set in a z-axis direction. It should be noted that, in this embodiment of this application, for the cylindrical lens, the principal axis may be understood as a straight line that is perpendicular to the flat surface of the cylindrical lens and passes through a center of the flat surface.

In some other implementations, in the circumferential direction of the lens 23, the cylindrical surface of the lens 23 may alternatively face the inner side of the opening 11, and the flat surface of the lens 23 may face the outer side of the opening 11. In this case, the first refractive surface 231 is the cylindrical surface of the lens 23, and the second refractive surface 232 is the flat surface of the lens 23.

Still refer to FIG. 4. A guide rail 22 is fixed in a housing 10, and is located on one side of the first refractive surface 231 of the lens 23. During specific implementation, the guide rail 22 may be supported and fixed by using a mechanical part such as a support, or an end of the guide rail 22 may extend to contact an inner wall of the housing 10, to be connected to the inner wall of the housing 10 by welding, bonding, or the like. An antenna array 21 is slidingly disposed on the guide rail 22. The antenna array 21 is connected to a radio frequency path of the communication device, receives a radio frequency signal from the radio frequency path, and transmits the radio frequency signal toward the first refractive surface 231 of the lens 23. A signal beam is converged into a narrow beam through the lens 23 and is emergent from the second refractive surface 232, and then is further propagated to another communication device, so that the communication device 1 implements a signal sending function. A signal beam emitted by the another communication device may be propagated to the second refractive surface 232 of the lens 23, be converged into a narrow beam through the lens 23 and then be emergent from the first refractive surface 231, and then further propagated to the antenna array 21 and propagated by the antenna array 21 to the radio frequency path, so that the communication device 1 implements a signal receiving function.

In addition, to facilitate sliding connection between the antenna array 21 and the guide rail 22, the antenna assembly 20 may further include a sliding part 25. The antenna array 21 is fixedly disposed on the sliding part 25, and the sliding part 25 is slidingly assembled on the guide rail 22. In this way, when sliding on the guide rail 22, the sliding part 25 can drive the antenna array 21 to slide synchronously.

During specific configuration of the guide rail 22, the guide rail 22 may be of a linear structure, and extend in the housing 10 in a horizontal direction (in other words, the x-axis direction). In this way, when the antenna array 21 slides on the guide rail 22, a beam direction of the antenna array 21 also moves in the horizontal direction, so that beam sweeping in the horizontal dimension can be implemented. In addition, the guide rail 22 may be approximately located on a focal plane of the lens 23. Moreover, during specific configuration and as shown in FIG. 5, the guide rail 22 intersects a principal axis o of the lens 23, and an included angle α between the guide rail and the principal axis o of the lens may range from 80° to 100°. When the guide rail is located in the focal plane of the lens 23, the guide rail 22 and the principal axis o of the lens 23 perpendicularly intersect each other, thereby improving signal transmission quality.

Figure 6:
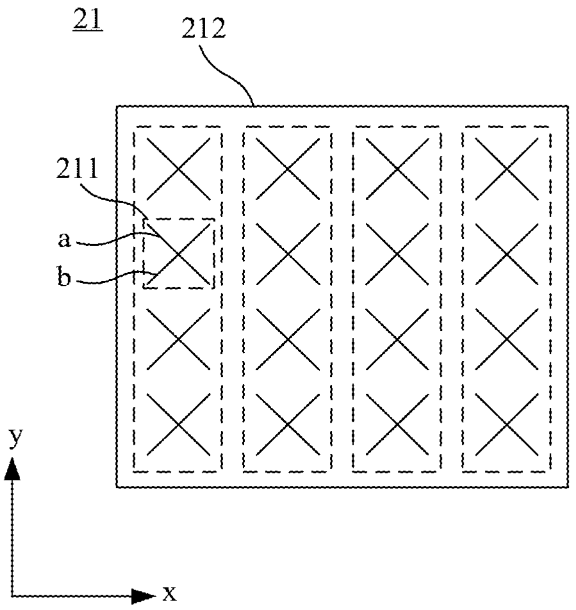
FIG. 6 is a front view of an antenna array according to an embodiment of this application.

FIG. 6 is a front view of an antenna array according to an embodiment of this application. Refer to FIG. 5 and FIG. 6 together. The antenna array 21 includes a plurality of radiating elements 211. The plurality of radiating elements 211 are arranged in a specific array form. For example, as shown in the figure, the radiating elements are arranged in the x-axis direction and the y-axis direction separately to form a rectangular array. To facilitate fixing of locations of the radiating elements 211, the antenna array 21 may further include a fixing support 212 configured to support the radiating elements 211. The radiating elements 211 may be specifically mounted on the fixing support 212 by bonding, snap-fitting, or the like. In addition, a quantity of the radiating elements 211 shown in FIG. 4 is merely an example. In actual application, the quantity of the radiating elements 211 may alternatively be greater than or less than 4*4 in FIG. 5, and may be specifically set according to a specific application scenario of the communication device 1. Details are not described herein.

In some implementations, each radiating element 211 may include a subunit a and a subunit b. The subunit a and the subunit b may be configured to enable the radiating element 211 to implement two mutually orthogonal polarized waves, so that the radiating element 211 forms a dual-polarized antenna. In this way, the antenna assembly 20 has good radiation performance, and integrity of the antenna assembly 20 is improved.

Still refer to FIG. 5 and FIG. 6. In this embodiment of this application, each phase shifter 24 is connected to a radiating element 211, and is configured to adjust a feed phase of the radiating element 211. During specific implementation, a quantity of phase shifters 24 and a quantity of radiating elements 211 may be identical. In other words, the phase shifters 24 and the radiating elements 211 may be connected in a one-to-one correspondence. In this case, each phase shifter 24 may be configured to adjust the feed phase of the radiating element 211 corresponding to the phase shifter 24. A pointing direction of a signal beam is always perpendicular to an equiphase surface, and the equiphase surface is determined by a feed phase relationship between the radiating elements 211. Therefore, a direction of the signal beam may be adjusted by adjusting the feed phase of each radiating element 211, thereby achieving an objective of beam sweeping.

Based on the foregoing principle, in specific design, for each row of radiating elements 211 arranged in the x-axis direction (the horizontal dimension), in a same row of radiating elements 211 in the x-axis direction, a phase of a radiation signal of each subunit a may be adjusted by the phase shifter 24, and a phase of a radiation signal of each subunit b may also be adjusted by the phase shifter 24. In this way, a pointing direction of a signal beam in the horizontal dimension can be adjusted by controlling a value of a phase difference that is output by the phase shifter 24 to each row of radiating elements 211, thereby implementing beam sweeping in the horizontal dimension.

Figure 7:
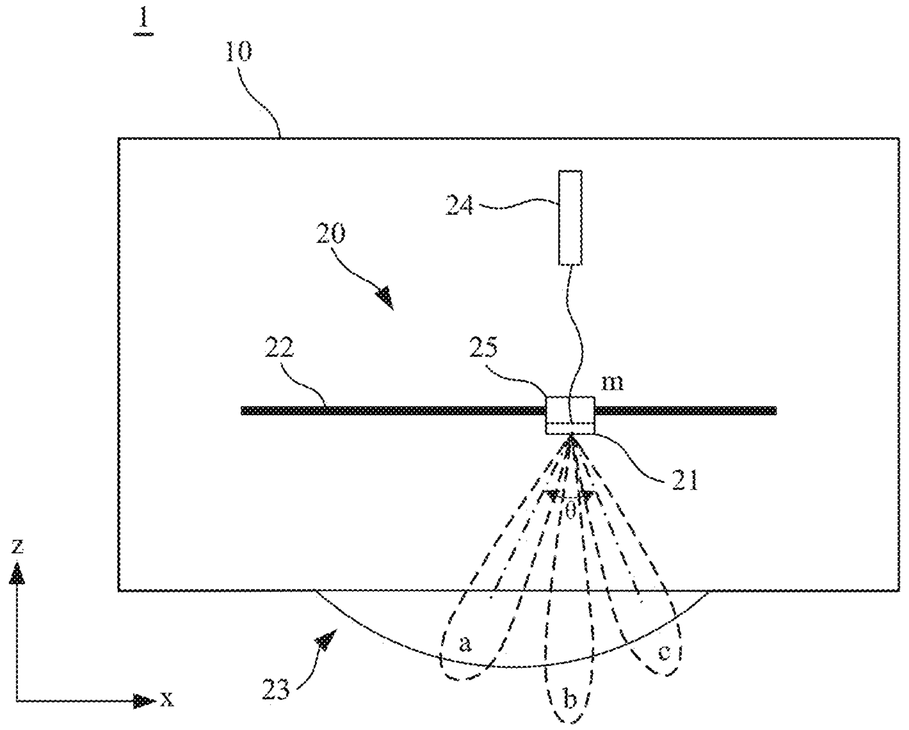
FIG. 7 is a schematic diagram of a beam sweeping principle of an antenna array of the communication device in FIG. 4 at a location X.
Figure 8:
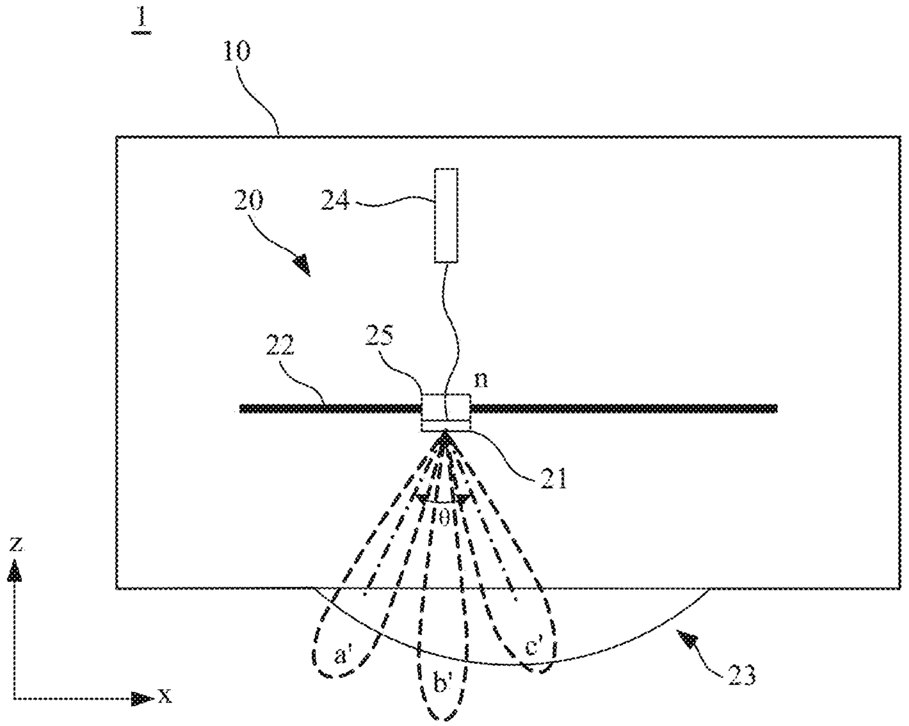
FIG. 8 is a schematic diagram of a beam sweeping principle of an antenna array of the communication device in FIG. 4 at a location X'.

FIG. 7 and FIG. 8 are each a schematic diagram of a beam sweeping principle of the communication device in FIG. 4. FIG. 7 shows a sweeping range of a signal beam when the antenna array 21 is at a location m on the guide rail 22, where a, b, and c respectively represent signal beams of the radiating elements having different phase differences. FIG. 8 shows a sweeping range of a signal beam when the antenna array 21 is at a location n on the guide rail, where a', b', and c' respectively represent signal beams of the radiating elements having different phase differences. It should be noted that the signal beam a and the signal beam a', the signal beam b and the signal beam b', and the signal beam c and the signal beam c' are beams of the radiating elements that are configured to have identical phase differences. It can be learned from FIG. 7 and FIG. 8 that, when the antenna array 21 moves from the location m to the location n on the guide rail, the signal beam of the antenna array 21 also moves horizontally. For example, the signal beam a as a whole moves leftward from the location in FIG. 7 to the location of the signal beam a' in FIG. 8. Therefore, when the antenna array 21 moves from one end of the guide rail 22 to the other end, the signal beam also moves in a large range in the horizontal direction with movement of the antenna array 21, so that mechanical beam sweeping can be implemented within a first sweeping range in the horizontal dimension. In addition, when the antenna array 21 is at different locations, using the location m as an example, the phase shifter 24 is controlled to adjust the feed phase of each radiating element 211, and a pointing direction of the signal beam may be further adjusted within a specific modulation sweeping angle range, for example, the signal beam b is adjusted to the signal beam a or to the signal beam c, so that phase modulation sweeping is performed at the location within a second sweeping range. In this case, the first sweeping range is parallel to the second sweeping range, and both mechanical sweeping and phase modulation sweeping are performed in the horizontal dimension. By combining mechanical sweeping and electronic tuning sweeping, a sweeping range of the communication device 1 can be expanded overall, to enable the antenna assembly 20 to obtain a higher gain. In addition, because the guide rail 22 is of a linear structure, through the solution of this embodiment of this application, a profile height (in other words, a size in the z-axis direction) of the antenna assembly 20 may be further reduced while a gain of the antenna assembly 20 can be increased, so that space occupied by the antenna assembly 20 in the communication device can be reduced, thereby reducing an overall volume of the communication device 1.

Figure 9:
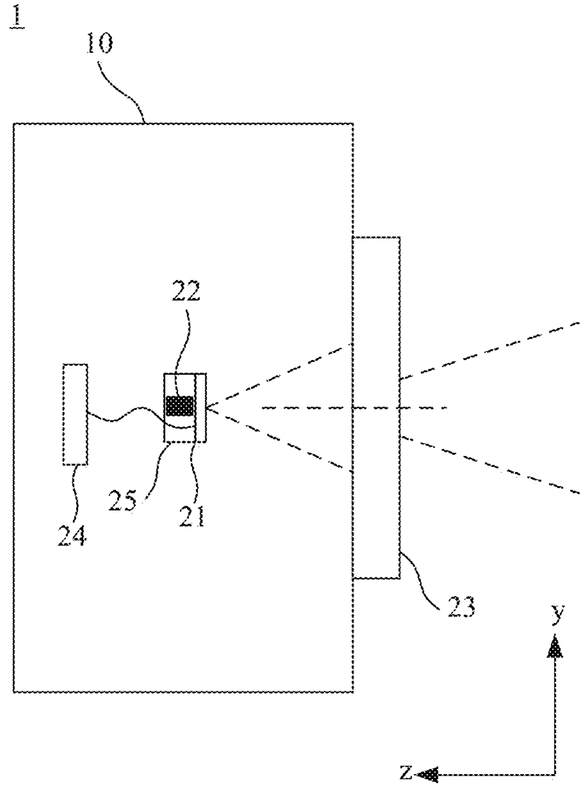
FIG. 9 is a side view of the communication device in FIG. 5.

FIG. 9 is a side view of the communication device in FIG. 4. Refer to FIG. 6 and FIG. 9 together. Similarly, for each column of radiating elements 211 arranged in the y-axis direction, in a same column of radiating elements 211 in the y-axis direction, a phase of a radiation signal of each subunit a may be adjusted by the phase shifter 24, and a phase of a radiation signal of each subunit b may also be adjusted by the phase shifter 24. In this way, a pointing direction of a signal beam in a vertical dimension can be adjusted by controlling a value of a phase difference that is output by the phase shifter 24 to each column of radiating elements 211, thereby implementing beam sweeping in the vertical dimension. In this case, the first sweeping range intersects the second sweeping range, and both mechanical sweeping and phase modulation sweeping are performed in each of the horizontal dimension and the vertical dimension. Therefore, the sweeping range of the communication device can be expanded.

Figure 10:
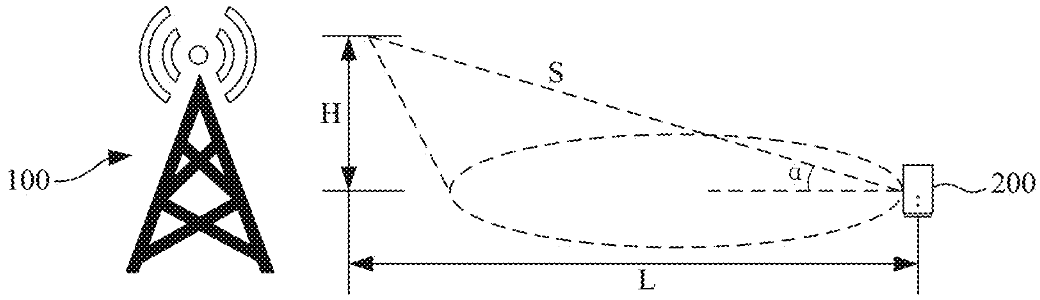
FIG. 10 is a schematic diagram of orientations of a base station and CPE.

It should be noted that, when the communication device is CPE, refer to a schematic diagram of orientations of a base station and the CPE shown in FIG. 10, and dashed lines in the figure may be understood as a beam range of a signal sent by the base station 100. It can be learned that a horizontal distance L between the CPE 200 and the base station 100 is far greater than a height H of an antenna of the base station 100. An included angle α between a connection line S between a signal transmission port of the base station 100 and the CPE 200 and the horizontal direction is very small, and the connection line S is set to be almost horizontal. For the CPE 200, a signal emitted by the base station 100 can be received in the vertical dimension without performing beam sweeping. Therefore, it is only necessary to control a beam width and a beam direction in the vertical dimension during design, to enable the antenna to obtain a high gain.

Based on this, refer to FIG. 6 and FIG. 9 again. In some other embodiments of this application, in the y-axis direction, in a same column of radiating elements 211, there is a fixed phase difference between radiation signals of subunits a of adjacent radiating elements 211, and there is also a fixed phase difference between radiation signals of subunits b of adjacent radiating elements 211. In other words, the communication device 1 has a fixed signal beam direction in the vertical dimension. A specific value of the phase difference may be obtained through simulation when a beam shape of the antenna array 21 in the vertical dimension is designed, and the value is taken based on a principle of reducing a width of a signal beam in the vertical dimension as much as possible. In this design, because phases of the radiating elements 211 arranged in the y-axis direction may not be adjusted, design difficulty and structural complexity of the antenna assembly can be lowered without affecting radiation performance of the communication device 1.

Figure 11:
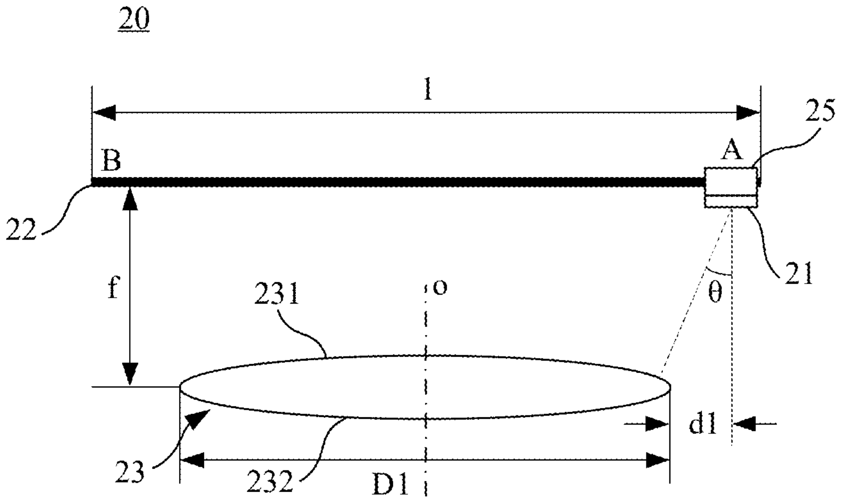
FIG. 11 is a schematic diagram of a partial structure of an antenna assembly in an operating state according to an embodiment of this application.
Figure 12:
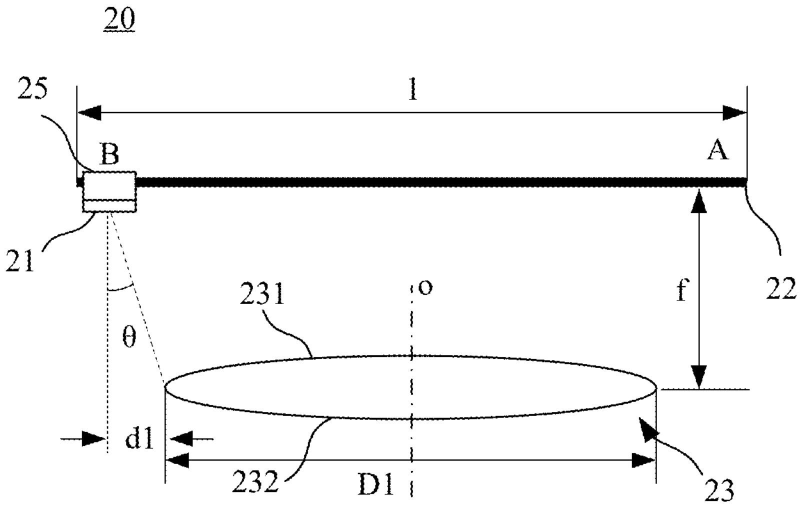
FIG. 12 is a schematic diagram of a partial structure of an antenna assembly in another operating state according to an embodiment of this application.

FIG. 11 is a schematic diagram of a partial structure of an antenna assembly in an operating state according to an embodiment of this application. FIG. 12 is a schematic diagram of a partial structure of an antenna assembly in another operating state according to an embodiment of this application. Refer to FIG. 11 and FIG. 12 together. When an antenna array 21 moves on a guide rail 22, to improve signal transmission quality, a signal beam emitted by the antenna array 21 may be completely incident to a lens 23 through a first refractive surface 231, and be emergent from a second refractive surface 232 after being converged by the lens 23. If the signal beam exceeds a range of the first refractive surface 231 when passing through the lens 23, or is completely emergent from an edge of the lens 23 to the outside of a housing 10, signal quality is deteriorated.

Therefore, during specific implementation, to enable the signal beam emitted by the antenna array 21 to be completely incident to the lens 23 from the first refractive surface 231, extreme movement locations of the antenna array 21 on the guide rail 22 may be set. The extreme movement locations are locations of the antenna array 21 on the guide rail 22 that are farthest from a principal axis o of the lens 23. It should be understood that the antenna array 21 has two extreme movement locations. It is assumed that the two extreme movement locations are a location A and a location B, respectively. The location A and the location B are axisymmetric on the guide rail 22 with the principal axis o of the lens 23 as a symmetry axis. For the antenna array 21, when the antenna array 21 performs phase modulation sweeping at the location A or the location B, if an emitted signal beam can be completely incident to the lens 23, then when the antenna array 21 is at any location between the location A and the location B, the emitted signal beam can also be completely incident to the lens 23 definitely. Therefore, during design, the location A and the location B may be determined first, and then the antenna array 21 is configured to move always between the location A and the location B in a beam sweeping process.

Refer to FIG. 11. When the antenna array 21 is at the location A, a phase shifter 24 is controlled to adjust a feed phase of each radiating element 211, to perform phase modulation sweeping. In this case, to ensure that a signal beam emitted by the antenna array 21 does not exceed the range of the first refractive surface 231, a horizontal distance d1 between the location A and an edge of the lens 23 satisfies:

$$d1 \leq f^{*}\tan\,\theta.$$

f is a vertical distance between the lens 23 and the guide rail 22. When the guide rail 22 is located on a focal plane of the lens 23, f is a focal length of the lens 23. θ is a maximum phase modulation sweeping angle. A phase modulation sweeping angle is determined based on a phase difference between radiation signals of the radiating elements 211. An adjustment range of the phase difference may be obtained through simulation during design, so that a value of θ may be obtained.

Similarly, refer to FIG. 12. When the antenna array 21 is at the location B, to ensure that the signal beam emitted by the antenna array 21 does not exceed the range of the first refractive surface 231, a horizontal distance d2 between the location B and the edge of the lens 23 also satisfies:

$$d1 \leq f^{*}\tan\,\theta.$$

It may be understood that, under the foregoing condition, a length l of the guide rail 22 satisfies l≥D1+2*f*tan θ. When the lens 23 is a convex lens. D1 is a diameter of the lens 23. In specific design, horizontal distances between two ends of the guide rail 22 and the principal axis o of the lens 23 may be identical or different and are not limited in this application, provided that a horizontal distance between any end of the guide rail 22 and a corresponding end of the lens 23 is not less than f*tan θ, to prevent the antenna array 21 from sliding off the guide rail 22 when moving to the location A or the location B.

Figure 13:
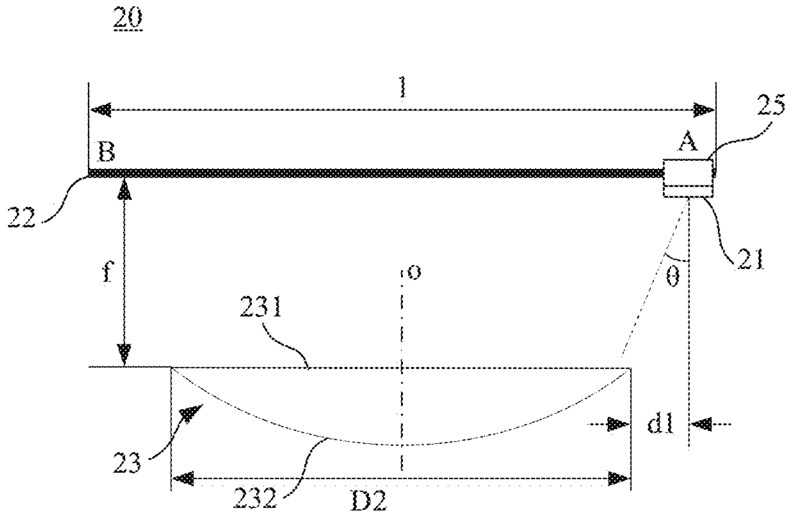
FIG. 13 is a schematic diagram of a partial structure of an antenna assembly in an operating state according to another embodiment of this application.
Figure 14:
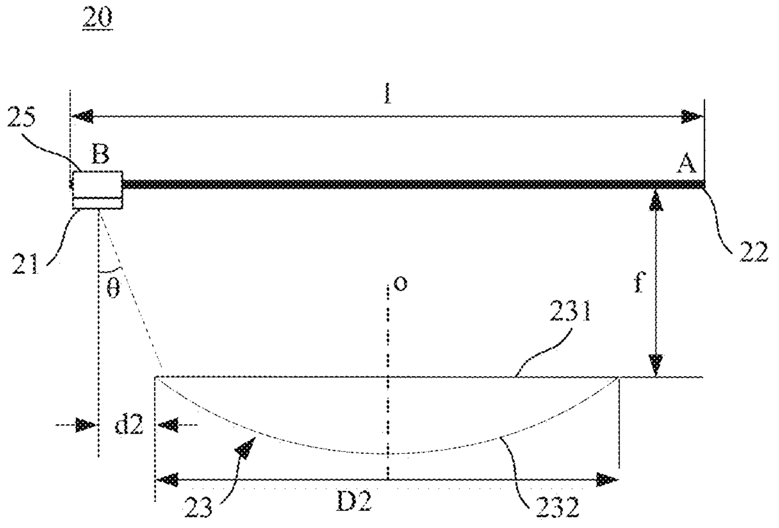
FIG. 14 is a schematic diagram of a partial structure of an antenna assembly in another operating state according to another embodiment of this application.

When the lens 23 is a cylindrical lens, refer to FIG. 13 and FIG. 14 together. The horizontal distance d1 between the location A and the edge of the lens 23 and the horizontal distance d2 between the location B and the edge of the lens 23 also satisfy:

$$d1 \leq f^{*}\tan\,\theta,\ \text{and}\ d2 \leq f^{*}\tan\,\theta.$$

Under the foregoing condition, the length 1 of the guide rail 22 satisfies l≥D2+2*f*tan θ. In this case, D2 is specifically a width of the lens 23. Similarly, horizontal distances between two ends of the guide rail 22 and the principal axis o of the lens 23 may be identical or different, provided that a horizontal distance L' between any end of the guide rail 22 and a corresponding end of the lens 23 is not less than f*tan θ.

In addition, in this embodiment of this application, the antenna assembly 20 may further include a driving mechanism. The driving mechanism may be configured to drive the antenna array 21 to slide on the guide rail 22, to improve operating reliability of the antenna assembly 20. During specific implementation, the driving mechanism may use a plurality of driving manners, such as electromagnetic driving or electrical driving. For example, in electrical driving, the driving mechanism includes a motor and a transmission component. The motor may be connected to a circuit board of the CPE, to obtain electric energy required during operating. The transmission component is configured to transfer, to the antenna array 21, a driving force that is output by the motor during operating, to drive the antenna array 21 to move.

Figure 15:
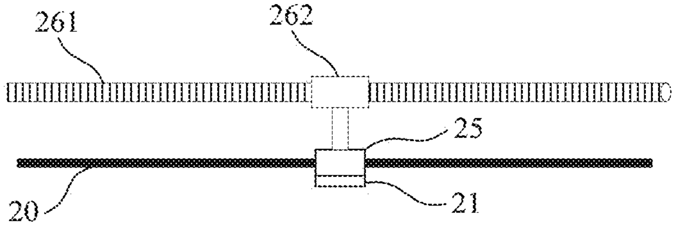
FIG. 15 is a schematic diagram of a partial structure of an antenna assembly according to an embodiment of this application.

FIG. 15 is a schematic diagram of a partial structure of an antenna assembly according to an embodiment of this application. Refer to FIG. 13. The transmission component may be specifically a screw. The screw includes a screw rod 261 and a nut 262 assembled on the screw rod 261. The screw rod 261 is connected to an output shaft of the motor, and the nut 262 is fixedly connected to the sliding part 25. In this way, a rotation motion that is output by the motor can be converted into a linear motion that can drive the sliding part 25 to move, and then the sliding part 25 drives the antenna array 21 to move synchronously.

In another embodiment of this application, the driving mechanism may alternatively be a linear motor. In this case, an output end of the linear motor may be directly connected to the sliding part 25 or the antenna array 21, and no intermediate conversion component such as a screw is required. This lowers structural complexity of the antenna assembly 20.

Figure 16:
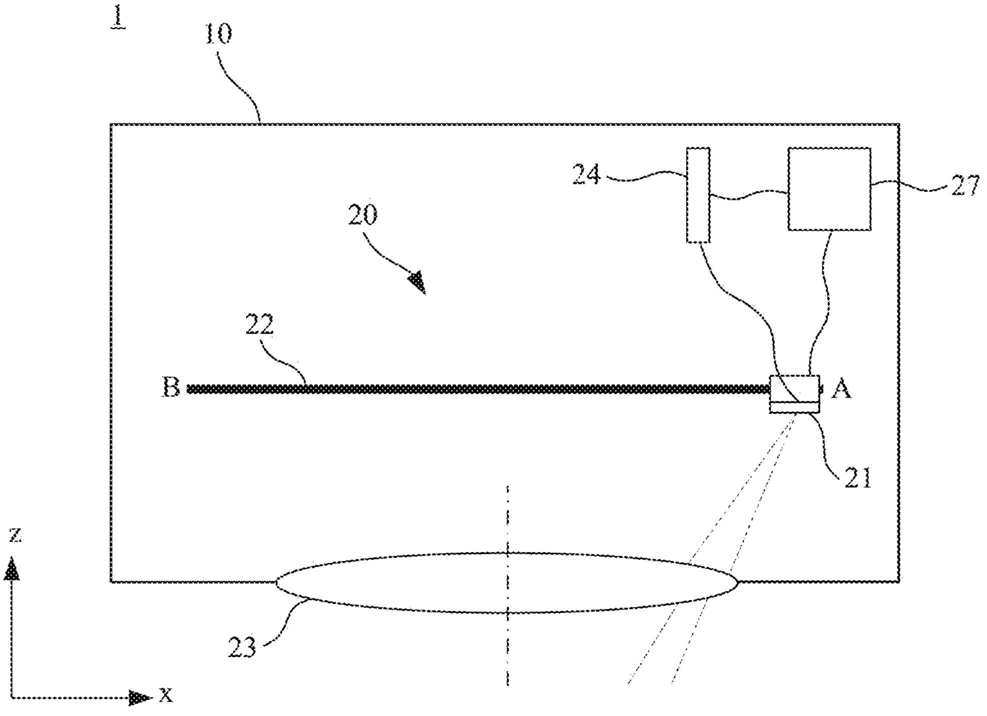
FIG. 16 is a top view of a communication device according to still another embodiment of this application.

FIG. 16 is a top view of a communication device according to another embodiment of this application. In this embodiment, an antenna assembly 20 further includes a control unit 27. The control unit 27 may be disposed on a circuit board of the communication device 1. The control unit 27 is connected to a driving mechanism, and is configured to control the driving mechanism to drive an antenna array 21 to move between a location A and a location B on a guide rail 22. In addition, the control unit 27 may be further connected to a phase shifter 24, to control the phase shifter 24 to adjust a feed phase of each radiating element. During beam sweeping, the control unit 27 may control the driving mechanism to drive the antenna array 21 to move between locations in sequence, and each time the antenna array 21 reaches a location, control the phase shifter 24 to adjust the feed phase of each radiating element, to perform phase modulation sweeping once. In this way, a location of the antenna array 21 and a phase that is output by each phase shifter 24 when the antenna assembly 20 obtains a maximum gain can be learned.

Certainly, to simplify a beam sweeping process, in some other implementations, an initial phase difference may be set first, each phase shifter 24 is controlled based on the initial phase difference to output an initial phase to a corresponding radiating element; and then the antenna array 21 is gradually moved from the location A to another location B, or gradually moved from the location B to the location A, to complete one round of mechanical sweeping. The antenna array 21 is moved, based on a result of the mechanical sweeping, to a location at which the maximum gain is obtained, phase modulation sweeping is performed at the location, and a phase that is output by each phase shifter when the maximum gain is obtained at the location is recorded.

In addition, it should be noted that, the control unit 27 may further detect location information of the antenna array 21, and record the detected location information and a gain corresponding to each piece of location information, to control, after mechanical sweeping is completed, the antenna array 21 to move to the location at which the maximum gain is obtained.

The following specifically describes the foregoing beam sweeping process with reference to FIG. 14 by using an example in which the communication device 1 is CPE.

Step 1: After the CPE is powered on, when the antenna array 21 is at the location A, the control unit 27 controls, based on a set initial phase difference, the phase shifter 24 to output an initial phase to each radiating element.

In the foregoing step, when the CPE is designed, the location A may be set as an initial location of the antenna array 21. In this way, after the CPE is powered on, the antenna array 21 is at the initial location. Alternatively, in some other implementations, after the CPE is powered on, the control unit 27 may deliver an instruction to the driving mechanism, to control the driving mechanism to move the antenna array 21 to the location A. Certainly, in some other embodiments, the location B may alternatively be set as the initial location of the antenna array 21, or after the CPE is powered on, the driving mechanism is controlled to move the antenna array 21 to the location B, so that the antenna array gradually moves from the location B to the location A during mechanical sweeping.

In addition, the initial phase difference may be any value within an adjustable range of the phase difference. This is not limited in this application. For example, in a specific implementation, in a same row of radiating elements, an initial phase difference between radiation signals of two adjacent radiating elements may be 0°. In other words, initial phases of the radiating elements are the same.

Step 2: After a radio signal sent by the base station is received, the control unit 27 measures a reference signal received power (reference signal received power, RSRP for short, being a parameter representing strength of a radio signal) of the radio signal obtained at a current location, and performs recording based on the current location. Next, the control unit 27 controls the driving mechanism to drive the antenna array 21 to move toward the location B, measures, each time the antenna array 21 moves to a location, an RSRP value of a radio signal obtained at the location, and then records location information and the RSRP value correspondingly until the antenna array 21 moves to the location B. In this way, location information of each location and a corresponding RSRP value can be obtained. Table 1 describes recorded results.

TABLE 1

| Location information | RSRP/dBm |
|---|---|
| X1 | P1 |
| X2 | P2 |
| X3 | P3 |
| . . . | . . . |
| Xn-1 | Pn-1 |
| Xn | Pn |

In Table 1, X1 and Xn respectively represent the location A and the location B, and X2 to Xn−1 sequentially represent locations between the location A and the location B. It should be noted that a distance between two adjacent locations is related to precision of a stepper motor selected for the driving mechanism. Higher precision of the stepper motor indicates a smaller distance between two adjacent locations and higher beam sweeping precision. In actual application, a stepper motor with high precision may be selected while a requirement on beam sweeping efficiency is satisfied, to implement more accurate sweeping.

Step 3: After one round of mechanical sweeping is completed, the control unit 27 controls, based on the information recorded in Table 1, the driving mechanism to drive the antenna array 21 to return to a location corresponding to a maximum RSRP value, and records the location as an optimal location.

Step 4: At the location corresponding to the maximum RSRP value, the control unit 27 sends a phase configuration signal to each phase shifter 24, adjusts a phase difference between radiation signals of radiating elements in each row through the phase shifter 24, to perform phase modulation sweeping, and obtains and records RSRP values corresponding to different phase differences. Table 2 describes recorded results.

TABLE 2

| Phase combination | RSRP/dBm |
|---|---|
| (y11, y12, y13, . . . , y1m) | P1' |
| (y21, y22, y23, . . . , y3m) | P2' |
| (y31, y32, y33, . . . , y3m) | P3' |
| . . . | . . . |
| (yn1, yn2, yn3, . . . , ynm) | Pn' |

In Table 2, ynm represents a phase value of a radiating element in an $n^{th}$ row and an $m^{th}$ column in the antenna array 21. It should be noted that, to ensure that a signal beam points to a normal direction of the antenna array during phase modulation sweeping, phase differences between radiation signals of adjacent radiating elements in a same row are equal.

Step 5: According to the information recorded in Table 2, a phase combination corresponding to the obtained maximum RSRP value is determined, and the combination is recorded as an optimal phase combination. The optimal location and the optimal phase combination of the antenna array 21 that correspond to the obtained maximum RSRP value, and the maximum RSRP value Pbest are recorded, and the antenna array 21 is controlled to send and receive information at the optimal location with the optimal phase combination, to ensure that the communication device completes uplink and downlink services.

Step 6: When operating at the optimal location with the optimal phase combination, the antenna array 21 periodically obtains an RSRP value of a received radio signal. The RSRP value is denoted as P0. Theoretically, values of P0 and Pbest are the same. However, if a channel environment changes, the value of P0 also changes. In this case, P0 and Pbest are different. Based on this, P0 may be compared with Pbest, and when $TH1 \leq Pbest-P0 < TH2$, step 3 to step 5 are repeated to re-obtain the optimal phase combination and Pbest of the antenna array. When $Pbest-P0 \geq TH2$, step 1 to step 5 are repeated to re-obtain the optimal location, the optimal phase combination, and Pbest of the antenna array.

TH1 and TH2 are respectively set thresholds pre-stored in the control unit 27, and satisfy $TH1 < TH2$. Specific values of TH1 and TH2 may be manually set according to experience, or may be obtained through experiment or simulation. This is not limited in this application.

Step 7: Step 1 to step 5 are repeated at intervals of a set time, and the optimal location, the optimal phase combination, and the corresponding Pbest of the antenna array 21 are refreshed, so that the antenna assembly 20 always has good radiation performance, thereby improving transmission quality of the radio signal.

By performing the foregoing steps, the CPE can efficiently and accurately complete beam sweeping, determine the optimal location of the antenna array 21 on the guide rail 22 and the optimal phase combination of each radiating element, so that the antenna assembly 20 can obtain a high gain. In addition, the CPE can further update the optimal location and the optimal phase combination in real time, so that radiation performance of the antenna assembly can be further improved, and the CPE can always send and receive signals in a good operating state.

Figure 17:
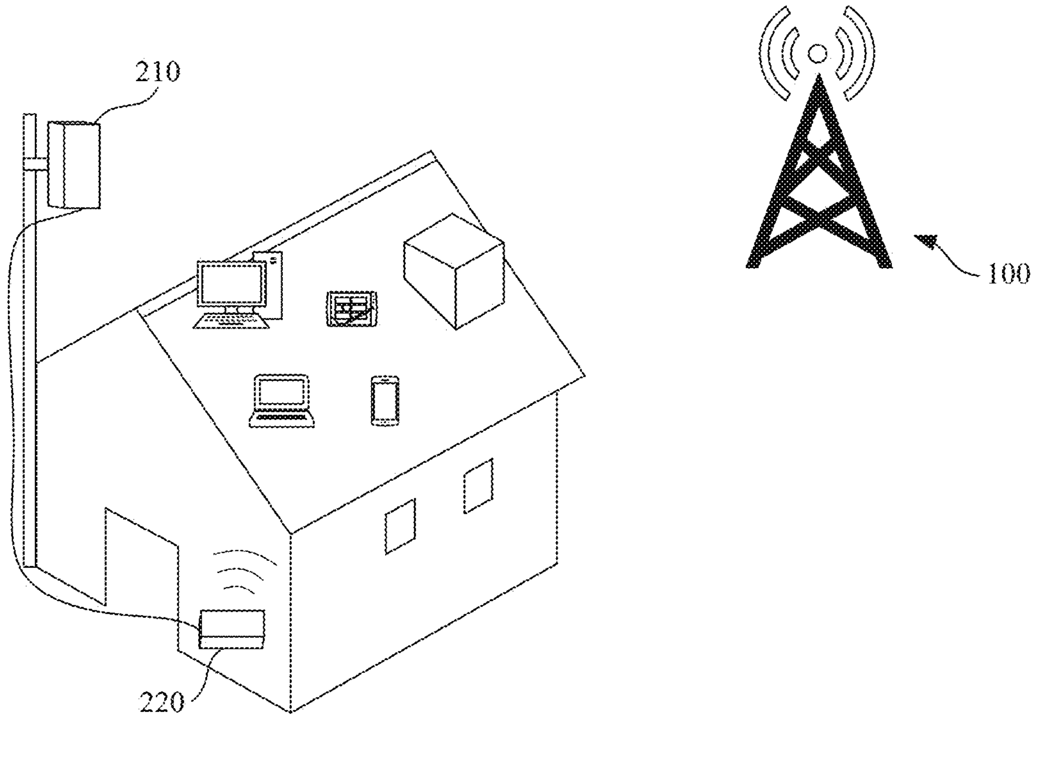
FIG. 17 is a schematic diagram of a specific application scenario of CPE according to an embodiment of this application.

The following specifically describes an effect of the foregoing beam sweeping manner with reference to a specific application scenario of CPE shown in FIG. 17. The CPE includes an outdoor unit 210 (outdoor unit, ODU for short) and an indoor unit 220 (indoor unit, IDU for short). During specific configuration, the ODU 210 may be fixed outdoors by attaching to a mast, a wall, or the like. For example, in FIG. 12, the ODU 210 is specifically fixed by attaching to a mast. The IDU 220 may also be fixed indoors by attaching to a wall, or placed on the top of an indoor desk. The ODU 210 may be connected to the IDU 220 by using a cable. The ODU 210 may receive a signal sent by a base station, and transmit the signal to the IDU 220 by using the cable. The IDU 220 then performs conditioning and digital processing on the received signal, and converts the signal into a Wi-Fi signal universal to mobile terminals such as a smartphone, a tablet computer, and a notebook computer.

The ODU 210 has a built-in antenna array formed by 32 radiating elements. If only an existing phase modulation sweeping manner is used for beam sweeping, for example, a sweeping angle after beamforming may reach approximately ±45°, and after a signal beam emitted by the antenna array is emitted by the lens from a housing of the ODU 210, an antenna gain is increased by 3 dB in a forward direction. However, due to a convergence effect of the lens, the sweeping angle is reduced, for example, from ±45° to approximately ±30°.

However, in the solution in this embodiment of this application, the antenna array is slidingly assembled on the guide rail, and the phase shifter that can adjust each radiating element of the antenna array is disposed, so that the ODU 210 performs beam sweeping according to the foregoing step 1 to step 7. For example, a beam sweeping angle may reach approximately ±70°, and an antenna gain is substantially the same as the antenna gain obtained after beamforming through phase modulation sweeping. In other words, according to the CPE and the beam sweeping method provided in embodiments of this application, a stable antenna gain can be further maintained while implementing large-range beam sweeping, thereby improving radiation performance of the CPE.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An antenna assembly, comprising:

a lens comprising a first refractive surface and a second refractive surface;

a guide rail located on one side of the first refractive surface of the lens, wherein the guide rail is a linear guide rail;

an antenna array comprising a plurality of radiating elements arranged in an array, wherein the antenna array is slidingly connected to the guide rail, and wherein the antenna array is configured to move on the guide rail so that a beam pointing direction of the antenna assembly moves in an extension direction of the guide rail in order to perform mechanical beam sweeping within a first sweeping range in the extension direction of the guide rail, wherein in the extension direction of the guide rail, a length by which any end of the guide rail exceeds a corresponding end of the lens is l', wherein l' satisfies:

$$l' \geq f^{*}\tan\theta,$$

wherein f is a distance between the guide rail and the lens in a direction perpendicular to the extension direction of the guide rail, and wherein θ is a maximum phase modulation sweeping angle; and a phase shifter coupled to the plurality of radiating elements and configured to adjust feed phases of the plurality of radiating elements to perform, when the antenna array is at different locations on the guide rail, phase modulation sweeping within a second sweeping range by adjusting the feed phases of the radiating elements.

2. The antenna assembly of claim 1, wherein the lens is a convex lens, wherein a first convex surface of the convex lens is the first refractive surface, and wherein a second convex surface of the lens is the second refractive surface.

3. The antenna assembly of claim 1, wherein the lens is a cylindrical lens comprising a cylindrical surface and a flat surface that are connected in a circumferential direction, and wherein the cylindrical surface is the first refractive surface and the flat surface is the second refractive surface, or the flat surface is the first refractive surface and the cylindrical surface is the second refractive surface.

4. The antenna assembly of claim 3, wherein the extension direction of the guide rail is perpendicular to a length direction of the lens.

5. The antenna assembly of claim 1, wherein the guide rail is located in a focal plane of the lens to enable the antenna array, when moving on the guide rail, to receive a signal beam converged by the lens.

6. The antenna assembly of claim 5, wherein the guide rail intersects a principal axis of the lens, and wherein an included angle between the guide rail and the principal axis of the lens ranges from 80° to 100°.

7. The antenna assembly of claim 6, wherein the guide rail and the principal axis of the lens perpendicularly intersect each other.

8. The antenna assembly of claim 1, wherein the first sweeping range is parallel to the second sweeping range.

9. The antenna assembly of claim 1, wherein the first sweeping range intersects the second sweeping range.

10. The antenna assembly of claim 1, further comprising a driving mechanism coupled to the antenna array and configured to drive the antenna array to slide on the guide rail.

11. A communication device, comprising:

a housing comprising an inner cavity;

an antenna assembly, comprising:

a lens disposed on the housing and comprising a first refractive surface and a second refractive surface, wherein the second refractive surface faces away from the inner cavity;

a guide rail located on one side of the first refractive surface of the lens, wherein the guide rail is a linear guide rail;

an antenna array comprising a plurality of radiating elements arranged in an array, wherein the antenna array is slidingly connected to the guide rail, and wherein the antenna array is configured to move on the guide rail so that a beam pointing direction of the antenna assembly moves in an extension direction of the guide rail in order to perform mechanical beam sweeping within a first sweeping range in the extension direction of the guide rail wherein in the extension direction of the guide rail, a length by which any end of the guide rail exceeds a corresponding end of the lens is l', wherein l' satisfies:

$$l' \geq f^{*}\tan\theta,$$

wherein f is a distance between the guide rail and the lens in a direction perpendicular to the extension direction of the guide rail, and wherein θ is a maximum phase modulation sweeping angle;

a driving mechanism coupled to the antenna array and configured to drive the antenna array to slide on the guide rail; and a phase shifter coupled to the plurality of radiating elements and configured to adjust feed phases of the plurality of radiating elements to perform, when the antenna array is at different locations on the guide rail, phase modulation sweeping within a second sweeping range by adjusting the feed phases of the radiating elements; and a control unit disposed in the housing and separately coupled to the driving mechanism and the phase shifter, wherein the control unit is configured to:

control the driving mechanism to drive the antenna array to move on the guide rail; and send, when the antenna array moves to each location, a phase configuration signal to the phase shifter to control the phase shifter to adjust the feed phases of the radiating elements.

12. The communication device of claim 11, wherein the lens and the housing are of an integrated structure.

13. The communication device of claim 11, wherein the lens is a convex lens, wherein a first convex surface of the convex lens is the first refractive surface, and wherein a second convex surface of the lens is the second refractive surface.

14. The communication device of claim 13, wherein the extension direction of the guide rail is perpendicular to a length direction of the lens.

15. The communication device of claim 11, wherein the lens is a cylindrical lens comprising a cylindrical surface and a flat surface that are connected in a circumferential direction, and wherein the cylindrical surface is the first refractive surface and the flat surface is the second refractive surface, or the flat surface is the first refractive surface and the cylindrical surface is the second refractive surface.

16. The communication device of claim 11, wherein the guide rail is located in a focal plane of the lens to enable the antenna array, when moving on the guide rail, to receive a signal beam converged by the lens.

17. The communication device of claim 16, wherein the guide rail intersects a principal axis of the lens, and wherein an included angle between the guide rail and the principal axis of the lens ranges from 80° to 100°.

18. The communication device of claim 17, wherein the guide rail and the principal axis of the lens perpendicularly intersect each other.

19. The communication device of claim 11, wherein the first sweeping range is parallel to the second sweeping range.

20. The communication device of claim 11, wherein the first sweeping range intersects the second sweeping range.

* * * * *